Oct. 6, 1953  E. J. SCHAEFER  2,654,848
SUBMERGIBLE MOTOR CONSTRUCTION
Filed Dec. 8, 1949
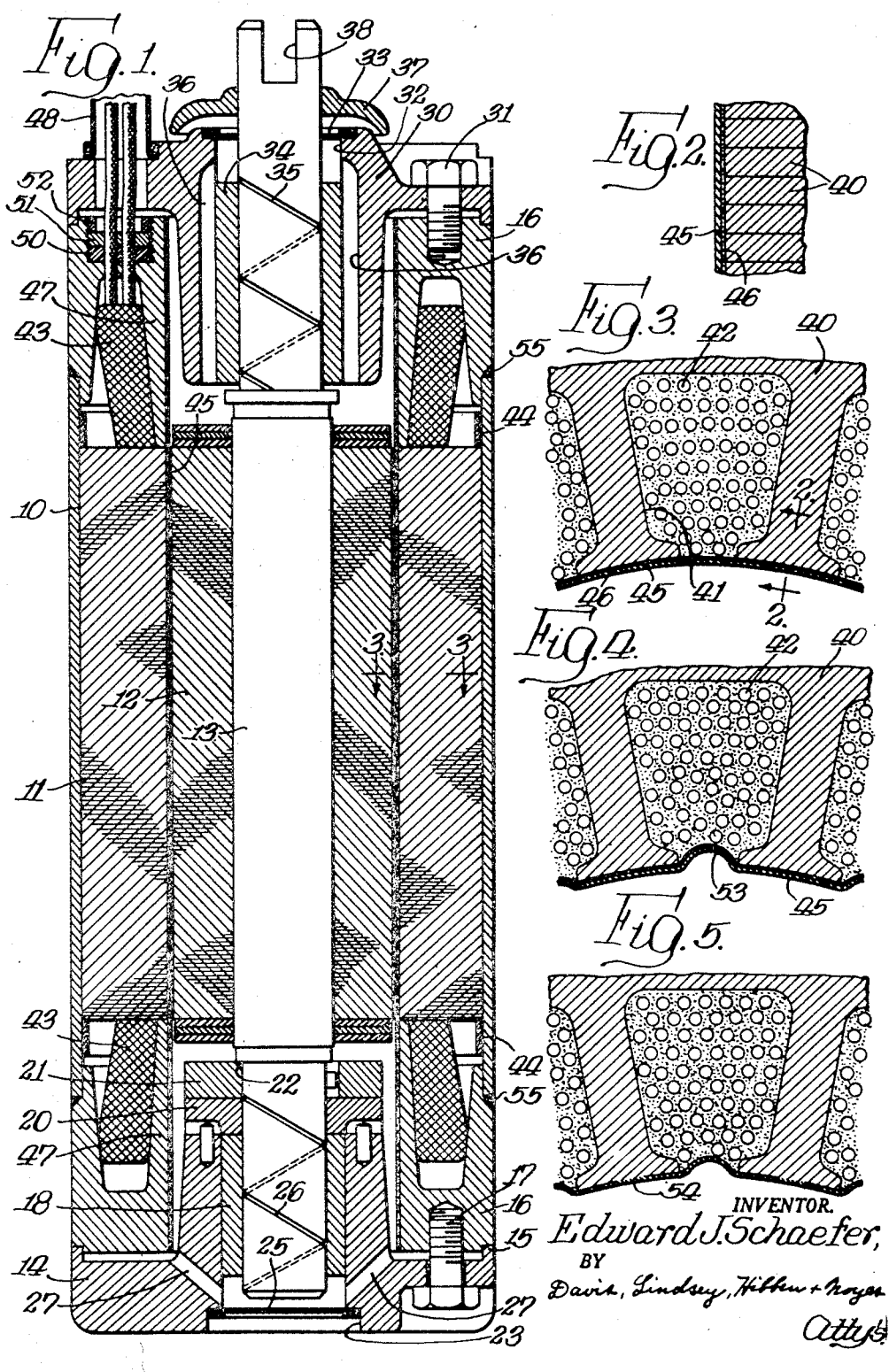
INVENTOR.
Edward J. Schaefer,
BY
Davis, Lindsey, Hibben & Noyes
Attys Patented Oct. 6, 1953

2,654,848

UNITED STATES PATENT OFFICE 2,654,848

SUBMERGIBLE MOTOR CONSTRUCTION

Edward John Schaefer, Fort Wayne, Ind.

Application December 8, 1949, Serial No. 131,888

6 Claims. (Cl. 310—86)

1

The invention relates generally to electric motors and particularly to electric motors adapted for operation when submerged in a liquid.

Electric motors have heretofore been made which have an outer casing completely enclosing both the rotor and the stator and completely sealing them from contact with the liquid in which the motor operates. Such a motor, however, requires a highly effective seal about the motor shaft and necessitates the provision of lubrication within the casing for the shaft bearings. Lubrication difficulties may be avoided by utilizing the liquid in which the motor operates as the lubricant but in such a construction the stator and rotor must be separately sealed to prevent access of the liquid to the rotor and stator windings and still permit free flow of the liquid through the motor to the bearings thereof. With this construction, not only are lubrication difficulties eliminated but the necessity of using rotating seals is avoided.

In a motor of this character, the rotor may be readily protected, since it is of the squirrel cage type without insulated windings. Thus, the exterior of the rotor may be protected by such conventional methods as plating the exterior surface or painting it, or subjecting the surface to the corrosion prevention treatment known commercially as "bonderizing," which is an iron phosphate coating formed by chemical action. The stator, which is of annular construction extending about the rotor, may be externally closed by a rigid metal casing or shell extending endwise beyond both ends of the stator and having end closures rigidly secured thereto. The interior of the stator, however, presents a problem in attempting to find a suitable seal. A suitable seal must, of course, perform its chief function of excluding liquid from the windings of the stator but it also must be such that it does not cause excessive electrical losses in the motor. Motors have heretofore been made in which a metallic cylinder is inserted into the stator and connected to the end closures to seal the stator windings. Such cylinders, while quite thin, have had sufficient thickness to be self-supporting, but with metal of such gauge, the electrical losses are so great as to render this construction impractical for most purposes.

The general object of the invention is, therefore, to provide a novel stator construction adapted to operate in a liquid and having its interior sealed in such a way that electrical losses due to the seal are held to a minimum.

Another object is to provide a novel stator con-

2 struction which is effectively sealed for operation in a liquid and in which the seal may be provided in a simple manner at a moderate manufacturing cost.

A further object is to provide a stator construction of the foregoing character, in which the expansion of the parts, due to heat generated during operation of the motor, is provided for.

Other objects and advantages will become apparent from the following description taken in connection with the accompanying drawings, in which:

Figure 1 is a longitudinal sectional view of a motor embodying the features of the invention.

Fig. 2 is a fragmentary sectional view, on an enlarged scale, taken substantially on the line 2—2 of Fig. 3.

Fig. 3 is a fragmentary sectional view, on an enlarged scale, taken substantially on the line 3—3 of Fig. 1.

Fig. 4 is a view similar to Fig. 3 but showing a modified form of construction.

Fig. 5 is a view similar to Figs. 3 and 4 but showing another modified form of construction.

As heretofore mentioned, the present invention relates to submergible electric motors, and in particular contemplates a motor of such character that the liquid, such as water, in which the motor is submerged, is free to pass through the motor between the stator and the rotor thereof. Motors of this type are frequently used in the bottom of a well and are connected to a pump to drive the latter. More specifically, the motor is usually suspended, and receives its support, from the pump casing and has its drive shaft connected to the shaft of the pump for operating the latter. Because of space restrictions, such a motor is usually made of small diameter but of quite elongated form.

As shown in Fig. 1 of the drawing, a motor of the type herein contemplated may comprise an outer shell or casing in the form of a cylindrical metal sleeve 10, within which is mounted a stator 11 of annular form and a rotor 12 positioned within the stator. In the present instance, the stator and rotor are shown as being positioned inermediate the ends of the shell 10 and the rotor is carried on a shaft 13 supported in bearings located at the ends of the shell. Thus, the bearing structure for the lower end of the rotor 12 comprises a bottom cap 14 having a short axially extending flange 15 fitting in a rabbeted groove formed on the periphery of an end closure 16 for the shell 10. To secure the cap rigidly to the end closure, a plurality of bolts 17 extends

through the cap and are threaded into the end closure. For radial support of the shaft 13, a cylindrical bearing member 18 is mounted in the cap 14 to embrace the lower end of the shaft 13. The bottom end of the motor also includes a bearing member 20 to take the thrust of the rotor, such bearing member coacting with a thrust plate 21 rigidly secured on the motor shaft in engagement with a shoulder 22 thereon.

As heretofore mentioned, the present invention contemplates a motor of the type where the liquid in which the motor is submerged is admitted to the interior of the motor structure. To this end, the bottom cap 14 is provided with a central aperture 23 for admission of the liquid. Since the liquid in the wells in which such motors operate frequently carry considerable sand, a screen 25 may be mounted in the aperture 23 to prevent the admission of the sand or other solid material but at the same time permitting the liquid to flow therethrough. The lower end of the shaft 13 preferably terminates slightly beyond the lower end of the bearing 18 and is provided with a helical groove 26 to circulate liquid through the bearing for lubrication purposes. The radial bearing member 18 as well as the thrust bearing member 20 are made of a material suitable for use with the liquid in which the motor operates. In the case of water, these two bearing members are preferably made of graphite. However, they may be made of any other suitable material, depending upon the character of the liquid. While some of the liquid is carried upwardly into the motor by the helical groove 26 in the end of the shaft 13, free flow of liquid is permitted through the bottom bearing cap 14 by means of a plurality of passages 27 extending upwardly and outwardly from the central aperture 23 above the screen 25. Thus, liquid is admitted freely to the lower end of the motor.

The upper end of the motor has a similar construction, although, of course, it requires no thrust bearing. Thus, an upper cap 30 may be provided which is similarly connected to the upper end closure 16 by means of a plurality of bolts 31. The upper cap 30 is provided with a central aperture 32 in the upper end of which is mounted a screen 33. Within the aperture 32 is positioned a bearing member 34 holding the upper end of the rotor shaft 13 properly positioned in the upper cap. The upper end of the shaft 13 may also be provided with a helical groove 35 to carry liquid through the bearing member 34 for lubrication purposes. Free flow of liquid into the upper end of the motor is permitted by a plurality of longitudinal grooves 36 opening into the central aperture 32 and extending from a point above the bearing member 34 downwardly to the lower end of the upper cap 30. To prevent sand from settling on the screen 33 and clogging it, a sand slinger 37 may be mounted on the upper end of the shaft 13 above the screen 33. In the present instance, the sand slinger 37 is illustrated as a disc having a downwardly turned lip at its periphery extending beyond the outer edge of the screen 33. The extreme upper end of the shaft 13 is provided with means for connecting it to the shaft of the pump, and in this instance is shown as having a transverse groove 38, into which a tongue on the pump shaft or on a separate coupling member may be inserted.

In motors of this type where liquid is admitted to the interior thereof, the rotor 12 as well as the stator 11 are separately sealed since the liquid would obviously have a harmful effect if permitted to enter the windings and laminations of the rotor or stator. The rotor, which may be of the squirrel cage type without insulated windings, can be easily protected against corrosion by methods which are more or less conventional. Thus, as heretofore stated, the exterior of the rotor may be protected by plating or painting the exterior surfaces thereof or subjecting such surfaces to a corrosion preventing treatment, such as forming an iron phosphate coating thereon by chemical action, which process has numerous commercial names, one of which is "bonderizing."

The stator, however, cannot be sealed on its interior by such a simple method as is employed in connection with the rotor because of the voltage characteristics of the windings in the stator. The stator comprises a core structure formed by a stack of annular laminations, which are indicated at 40 in Figs. 2 and 3, and the laminations are punched with a plurality of inwardly opening slots 41 to receive windings 42. Such windings usually project beyond the ends of the stack of laminations, as indicated at 43 in Fig. 1. The stack of laminations is preferably held in position within the shell 10 by means of a pair of rings 44 located at the upper and lower ends of the stack and secured to the shell 10 as by welding. The shell 10, of course, seals the exterior of the stator.

The interior of the stator must be equally well sealed to prevent the liquid from gaining access between the laminations and into the windings 42 in the slots 41. Such seal, however, must be of such a nature as not to interfere with the electrical characteristics of the motor. More specifically, the seal should not materially increase the air gap between the stator and the rotor, nor should the material of which the seal is made be such as to create high electrical losses by having induced in it large parasitic electric currents. At the same time, the interior seal must be fully capable of excluding the liquid from the stator itself and cannot be permitted to bulge due to heat generated in the motor or to pressure of the oil or plastic material which may be utilized to fill the interstices in the windings.

In the case of the metal cylinder or sleeve inserted within the stator in the air gap between the stator and rotor as heretofore employed, it has been deemed necessary to make such a sleeve of sufficient thickness to have it self-supporting and to be carried from the ends of the motor structure. But a cylinder of such thickness causes electrical losses in the motor which are so great that, for many purposes, such construction is highly impractical.

The present invention contemplates the use of a metal cylinder of high electrical resistance which is so thin that the electrical losses are minimized and the motor becomes practical in size and permits performance which would not be obtainable if the sleeve were of the thickness heretofore deemed necessary. However, with a sleeve of the present character, there is insufficient strength in the sleeve to render it self-supporting. The invention, therefore, contemplates having such a sleeve receive its mechanical support from the stator itself throughout the length thereof. It has been found that if such a sleeve is made of a high resistance metal not substantially thicker than .005 of an inch, the electrical losses involved are relatively minor and the sleeve itself, if rigidly secured to the stator throughout its length will retain its proper shape despite the changes of temperature and pressure to which it may be subjected and will effectively seal the stator against access of liquid thereto. With a sleeve of this character, it is contemplated that there may be an air gap between it and the rotor of about .012 of an inch.

In the drawing, such a sleeve is indicated at 45 in Figs. 1, 2 and 3. To secure the sleeve to the stator, and particularly to the stack of laminations 40, the sleeve is bonded to the stator, in the present instance, by coating the exterior of the sleeve with a metal-to-metal bonding or adhesive material, such as rubber base or resinous adhesive commonly utilized for metal-to-metal bonding. The sleeve after such coating is inserted into the stator and may be expanded by means such as a rubber expander into rigid adhesive engagement with the stack of laminations. Thus, in Figs. 2 and 3, I have illustrated such a coating at 46. Since the entire area of contact between the liner 45 and the stack of laminations 40 includes such adhesive coating 46, the liner is rigidly supported throughout its entire area of contact, thus giving it adequate support in spite of its extreme thinness.

The ends of the stator 11 may be sealed by the annular end closures 16 which are secured within the shell 10 as by welding. Each end closure 16 has an axially extending internal flange 47 aligned with, and of the same diameter as, the interior of the stator laminations and fitting over the outwardly projecting portions 43 of the stator winding. The liner 45 is made of sufficient length to extend within the flanges 47 and to be bonded thereto. Thus, the liner 45 is supported throughout its length. Wiring connections for the stator windings may be brought in through a tube 48 registering with an aperture in the upper cap 30 and extend through a sealing means mounted in an aperture in the end closure 16 and comprising a soft plastic washer 50, a metal pressure plate 51 and a bushing 52 threaded in the aperture and holding the washer and plate in place.

An electric motor, of course, tends to heat up during operation and the parts thereof are thus subject to expansion because of temperature increase. Moreover, since a motor of the present type is adapted to be operated while submerged in a liquid, the heat in outer portions of the motor, particularly in the shell 10, is rather rapidly carried off by the liquid, so that the interior portions of the motor, such as the liner 45, tend to reach a higher temperature than the shell 10. The expansion and contraction of the liner 45 must, therefore, be matched with the other parts of the stator to prevent the thin liner from being stressed to the point of failure on expansion or from being caused to bulge on contraction.

The laminated core structure must also be controlled as to its expansion. Because of the laminated construction, the core structure does not act like a homogeneous material but rather has a spongy or springy action due probably to the fact that the respective laminations are not perfectly flat and may even have slight burrs which would prevent them from lying truly flat against each other. It is, therefore, desirable to confine the expansion of the core structure to that of the outer shell 10, and it will be noted that with the structure herein described this result is attained. Thus, the rings 44 which abut against the outer periphery of the core structure and are welded to the shell 10 limit the expansion of the outer peripheral portion of the core structure to that of the shell. The laminations are, of course, placed under endwise pressure when the rings 44 are being assembled with the shell so that the laminations are rigidly held in place. The metal of which the laminations are made is determined by electrical considerations and may have a different coefficient of expansion from that of the shell but the springy nature of the core structure compensates for any such difference and permits the expansion of the core structure to be held to that of the shell.

The end closures 16, it will be noted, are also utilized to assist in confining the core structure. To this end, the internal flanges 47 on the end closures have their inner ends abutting the core structure at the inner periphery thereof, and these ends are located in the same planes transverse to the axis of the motor as the inner edges of the rings 44. In assembling the end closures 16 to the stator, the end closures have portions which are reduced in diameter to fit within the shell, and the reduction in diameter is made slightly longer than the intended overlap of the shell, as indicated at 55, to provide a small gap. Thus, when the end closures are put in place, they may be moved inwardly to apply the desired pressure to the core structure without interference by the shell, and the shell is then welded or brazed to the end closures. The end closures are made of a metal having substantially the same coefficient of thermal expansion as the shell, so that the core structure at its inner periphery expands and contracts substantially equally with the shell for the same temperature change.

Since the total endwise expansion of the inner surface of the core structure, to which the liner 45 is bonded, is thus correlated to that of the shell, the total expansion of the liner should be made to match that of such inner surface so that it will not be unduly stressed on expansion nor caused to bulge when contraction on cooling takes place. The higher temperature of the interior portions of the motor relative to the temperature of the shell during operation of the motor should also enter into consideration. Thus, if the liner is made of a material having substantially the same coefficient of expansion as that of the shell, it may be desirable to pre-stress the liner when it is bonded to the core structure and end closures, so that any higher temperature occurring therein over that of the shell, and the consequent increased expansion of the liner, will not cause it to bulge. Such pre-stressing of the liner may be accomplished by heating the liner to the desired degree during the bonding operation while the shell remains cool. Another method of compensating for a higher operating temperature internally of the motor than the temperature of the shell is by using a material for the liner which has a lower coefficient of expansion than that of the shell, so that the total expansion of the liner and shell are substantially equal. Also, if the liner and shell were both made of materials having very low coefficients of expansion, the relative total expansions of both would be such as could be considered negligible.

The slots 41 within which the windings are located may also be filled with a plastic filler or sealing compound having adhesive properties, which bond to the liner and thus provide additional support therefor, the liner of course bridging the open inner ends of the slots 41 and closing them. Such a plastic filler is preferably of a resinous character. Under some conditions, the original adhesive coating on the exterior of the liner 45 may be omitted and the adhesion obtained by the plastic filler directly on the liner may be relied upon for holding the liner in place.

The liner may be further rendered rigid and firmly bonded to the stator by having it expanded into the slots for the windings 42, as indicated at 53 in Fig. 4. Expanding the liner in this manner forms ridges or longitudinally extending ribs in the liner which interlock or key with the openings into the slots formed in the laminations 40. Such ribs or ridges may be formed in the metal liner before insertion of the liner into the stator or they may be formed after such insertion by expanding the liner. Another advantage of this construction lies in the fact that the ridges or ribs 53 add stiffness to the liner and thus reinforce it.

Another means of bonding the liner to the stack of laminations is by a series of stitch welds. Such welding comprises a plurality of welded spots at intervals, which, in this instance, would be spaced both peripherally and axially throughout the entire area of contact between the liner and the stack of laminations, thus rigidly supporting the liner throughout the entire interior of the stator. A filter having adhesive properties for filling the interstices between the windings in the stator slots could also be used with this construction. Such plastic material would be solidified by heat or chemical action, depending upon its composition, so that the sealed structure would present one solid mass. Of course, if it were deemed unnecessary to utilize an adhesive filler, the usual dielectric type oil could be introduced into the slots either under vacuum or under pressure, or both, to fill the interstices of the winding.

A substantially equivalent form of liner could be obtained by applying a metal spray to the interior of the stator to obtain a continuous water-tight surface. The sprayed metal may be a high resistance alloy similar to that used in making the liner of the forms heretofore described and can be applied by well-known methods involving the use of metal fed into an electrical arc or gas flame which vaporizes the metal and allows it to be blown onto the surface where it condenses and hardens. Thus, in Fig. 5, I have shown a liner 54 representing such a sprayed surface.

The metals which are suitable for a liner of any of the forms herein disclosed are such that have a high electrical resistance and may be alloys, such as stainless steel or those metals commercially known as Nichrome, constantan and others. When the liner is described either in the specification or in the claims as being bonded to the stator structure, the term is used in a sense broad enough to cover either such adhesion as is obtained by coating the liner with a metal-to-metal adhesive, or by the adhesive characteristics of the filler, or by welding, or by the adhesion attained by spraying the metal directly on the stator.

With any of the foregoing structures, a seal is provided which effectively excludes the liquid from the stator structure but at the same time is so thin and is of such a metal that the electrical losses due to the presence of the seal are held to a minimum. It will also be obvious that any one of the foregoing forms of seal may be readily applied to the stator of the motor in a simple manner and at a relatively low manufacturing cost.

I claim:

1. In a submersible electric motor, an annular stator adapted to be exposed to liquid both externally and internally and comprising an outer shell, laminated core structure within said shell having a central bore and a plurality of longitudinal slots extending inwardly to said bore, windings in said slots, a thin cylindrical liner in the bore of said core structure, said liner being made of metal of high electrical resistance and being sufficiently thin to substantially avoid electrical losses and thereby having insufficient mechanical strength to be self-supporting, an adhesive layer between said liner and said core structure, said liner thereby being adhesively bonded to the core structure intermediate said slots, plastic filling material disposed in said slots and filling the interstices of the windings for retaining the latter, said filling material also operatively engaging and adhering to the portions of said liner extending across said slots whereby said portions are likewise firmly bonded and supported throughout the length thereof, and means for sealing the ends of said core structure.

2. The structure defined in claim 1 further characterized in that said liner has a thickness not substantially greater than .005 inch.

3. The structure defined in claim 1 further characterized in that the portions of said liner extending across the slots are bulged outwardly and extend partially into said slots for mechanically keying the liner in position in said core structure.

4. In a submersible electric motor, an annular stator adapted to be exposed to liquid both externally and internally and comprising an outer shell, laminated core structure mounted within said shell and having a central bore and a plurality of longitudinal slots extending inwardly to said bore, windings disposed in said slots, annular closure means secured to said shell at the opposite ends thereof and having internal sleeve portions extending axially into engagement with the ends of said core structure and in alignment with the central bore thereof, a thin cylindrical liner disposed within the bore of said core structure and extending along said sleeve portions, said liner being made of metal of high electrical resistance and being sufficiently thin to substantially avoid electrical losses and thereby having insufficient mechanical strength to be self-supporting, an adhesive layer around the exterior of said liner whereby the liner is adhesively bonded to and supported throughout its length by said sleeve portions and the portions of said core structure intermediate said slots, and a plastic filling material disposed in said slots and filling the interstices of the windings for retaining the latter, said filling material also operatively engaging and adhering to the portions of said liner extending across said slots whereby said liner portions are likewise completely bonded and supported throughout the length thereof.

5. In a submersible electric motor, an annular stator adapted to be exposed to liquid both externally and internally and comprising an outer shell, laminated core structure within said shell having a central bore and a plurality of longitudinal slots extending inwardly to said bore, windings in said slots, a thin cylindrical liner in the bore of said core structure, said liner being made of metal of high electrical resistance and being sufficiently thin to substantially avoid electrical losses and thereby having insufficient mechanical strength to be self-supporting, an adhesive layer between said liner and said core structure whereby said liner is adhesively bonded to the core structure intermediate said slots for firmly bonding and supporting the liner throughout the length thereof, the portions of said liner extending across the slots being bulged outwardly and extending partially into said slots for mechanically keying the liner in position in said core structure and strengthening the same, and means for sealing the ends of said core structure.

6. In a submersible electric motor, an annular stator adapted to be exposed to liquid both externally and internally and comprising an outer shell, laminated core structure mounted within said shell and having a central bore and a plurality of longitudinal slots extending inwardly to said bore, windings disposed in said slots, annular closure means secured to said shell at the opposite ends thereof and having internal sleeve portions extending axially into engagement with the ends of said core structure and in alignment with the central bore thereof, a thin cylindrical liner disposed within the bore of said core structure and extending along said sleeve portions, said liner being made of metal of high electrical resistance and being sufficiently thin to substantially avoid electrical losses and thereby having insufficient mechanical strength to be self-supporting, the portions of said liner extending across the slots being bulged outwardly and extending partially into said slots for mechanically keying the liner in position in said core structure and strengthening the same, and an adhesive layer around the exterior of said liner whereby the liner is adhesively bonded to and supported throughout its length by said sleeve portions and the portions of said core structure intermediate said slots.

EDWARD JOHN SCHAEFER.

References Cited in the file of this patent

UNITED STATES PATENTS

| Number | Name | Date |
| --- | --- | --- |
| 755,819 | Watmough | Mar. 29, 1904 |
| 1,425,308 | Woock | Aug. 8, 1922 |
| 1,875,206 | Apple | Aug. 30, 1932 |
| 1,921,111 | Apple | Aug. 8, 1933 |
| 1,974,183 | Gunderson | Sept. 18, 1934 |
| 2,246,777 | Bordeaux | June 24, 1941 |
| 2,295,404 | Johns | Sept. 8, 1942 |
| 2,310,422 | Gold | Feb. 9, 1943 |
| 2,400,192 | Coons | May 14, 1946 |
| 2,422,592 | Sigmund | June 17, 1947 |
| 2,428,236 | Maxwell | Sept. 30, 1947 |
| 2,460,418 | Hart | Feb. 1, 1949 |
| 2,485,408 | Pezzillo | Oct. 18, 1949 |
| 2,562,283 | Sawyer | July 31, 1951 |
| 2,573,126 | Andrus | Oct. 30, 1951 |

FOREIGN PATENTS

| Number | Country | Date |
| --- | --- | --- |
| 121,490 | Great Britain | Dec. 18, 1918 |
| 463,015 | Great Britain | Mar. 19, 1937 |